US008849062B2

(12) United States Patent
Nanu et al.

(10) Patent No.: US 8,849,062 B2
(45) Date of Patent: *Sep. 30, 2014

(54) EYE DEFECT DETECTION IN INTERNATIONAL STANDARDS ORGANIZATION IMAGES

(71) Applicant: DigitalOptics Corporation Europe Limited, Galway (IE)

(72) Inventors: Florin Nanu, Bucuresti (RO); Peter Corcoran, Claregalway (IE); Petronel Bigioi, Galway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,863

(22) Filed: Jul. 22, 2013

(65) Prior Publication Data
US 2013/0329096 A1    Dec. 12, 2013

Related U.S. Application Data

(63) Continuation of application No. 11/861,257, filed on Sep. 25, 2007, now Pat. No. 8,503,818.

(51) Int. Cl.
G06K 9/40       (2006.01)
G06T 7/00       (2006.01)
G06K 9/46       (2006.01)
H04N 5/232      (2006.01)
G06K 9/00       (2006.01)

(52) U.S. Cl.
CPC ............ *G06K 9/4652* (2013.01); *G06T 7/0002* (2013.01); *G06T 2207/30216* (2013.01); *H04N 5/23219* (2013.01); *G06K 9/00597* (2013.01)
USPC .......................................... 382/275; 382/254

(58) Field of Classification Search
None
See application file for complete search history.

(56) References Cited

U.S. PATENT DOCUMENTS

| | | | |
|---|---|---|---|
| 6,278,491 B1* | 8/2001 | Wang et al. | 348/370 |
| 2005/0232490 A1* | 10/2005 | Itagaki et al. | 382/190 |
| 2005/0238217 A1* | 10/2005 | Enomoto et al. | 382/128 |
| 2008/0240555 A1* | 10/2008 | Nanu et al. | 382/167 |

OTHER PUBLICATIONS

Viola, Paul, and Michael Jones. "Robust real-time object detection."International Journal of Computer Vision 4 (2001): 34-47.*

* cited by examiner

*Primary Examiner* — Li Liu
(74) *Attorney, Agent, or Firm* — Hickman Palermo Truong Becker Bingham Wong LLP

(57) ABSTRACT

A method and apparatus for providing image processing. For one embodiment of the invention, a digital image is acquired. One or more relatively large candidate red eye defect regions are detected in at least a portion of the image. Face detection is applied to at least a portion of the image to eliminate non-face regions and one or more relatively small candidate red eye defect regions are identified in at least a portion of the image not including the eliminated non-face regions.

28 Claims, 3 Drawing Sheets

EYE DEFECT DETECTION IN INTERNATIONAL STANDARDS ORGANIZATION IMAGES

PRIORITY

This application is a Continuation of U.S. patent application Ser. No. 11/861,257, filed Sep. 25, 2007, now U.S. Pat. No. 8,503,818.

FIELD

Embodiments of the invention relate generally to the field of image processing and more specifically to methods and apparatuses for improved eye defect detection in digital images.

BACKGROUND

Light sensitivity ratings conforming to the international standard set by the International Standards Organization (ISO) are known as ISO ratings and denote a sensitivity of an imaging sensor of an acquisition device to an amount of light present. In digital acquisition devices, altering the ISO rating is a means of exposure control, which affects shutter speed and/or lens aperture. The higher the ISO rating, the more sensitive the imaging sensor, thereby leading to increased exposure of an acquired image. However, as the light sensitivity increases, the imaging sensor is capable of recording a fainter light signal, and thus it will be susceptible to recording noise.

Noise produced by an imaging sensor is undesirable and can appear in an image as numerous small red-pixel cluster artifacts, also known as noise speckles. The presence of noise speckles in an image degrades the operation of conventional red eye detection methods, such as disclosed in U.S. patent application Ser. No. 11/282,955 (FN128). Conventional red eye detection methods involve segmenting and labeling pixels or groups of pixels of an image into candidate red-eye regions. When such red eye detection methods are applied to images having a high ISO rating, many of the noise speckles are initially mistaken for red eye defects, and as a result, the segmenting and labeling operations of the method become computationally burdensome.

It is known to apply a face tracker/detector, such as disclosed in International Patent Application No. PCT/EP2007/005330 (FN143/171/175/161/185PCT) and International Patent Application No. PCT/EP2007/006540 (FN182/214/232PCT), to limit the application of the red eye detection method to confirmed face regions. However, the presence of noise speckles can also affect the accuracy of face detection/tracking. Thus, such an approach could introduce a further degree of error resulting in less accurate red-eye detection.

Furthermore, the computational requirements involved in running typical face detection/tracking prior to running red-eye detection would degrade or limit the performance of the face detector/tracker, the red-eye detector or both, particularly when implemented on real time image acquisition devices.

SUMMARY

In accordance with one embodiment of the invention, a digital image is acquired. One or more relatively large candidate red eye defect regions are detected in at least a portion of the image. Face detection is applied to at least a portion of the image to eliminate non-face regions and one or more relatively small candidate red eye defect regions are identified in at least a portion of the image not including the eliminated non-face regions.

Other features and advantages of embodiments of the invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
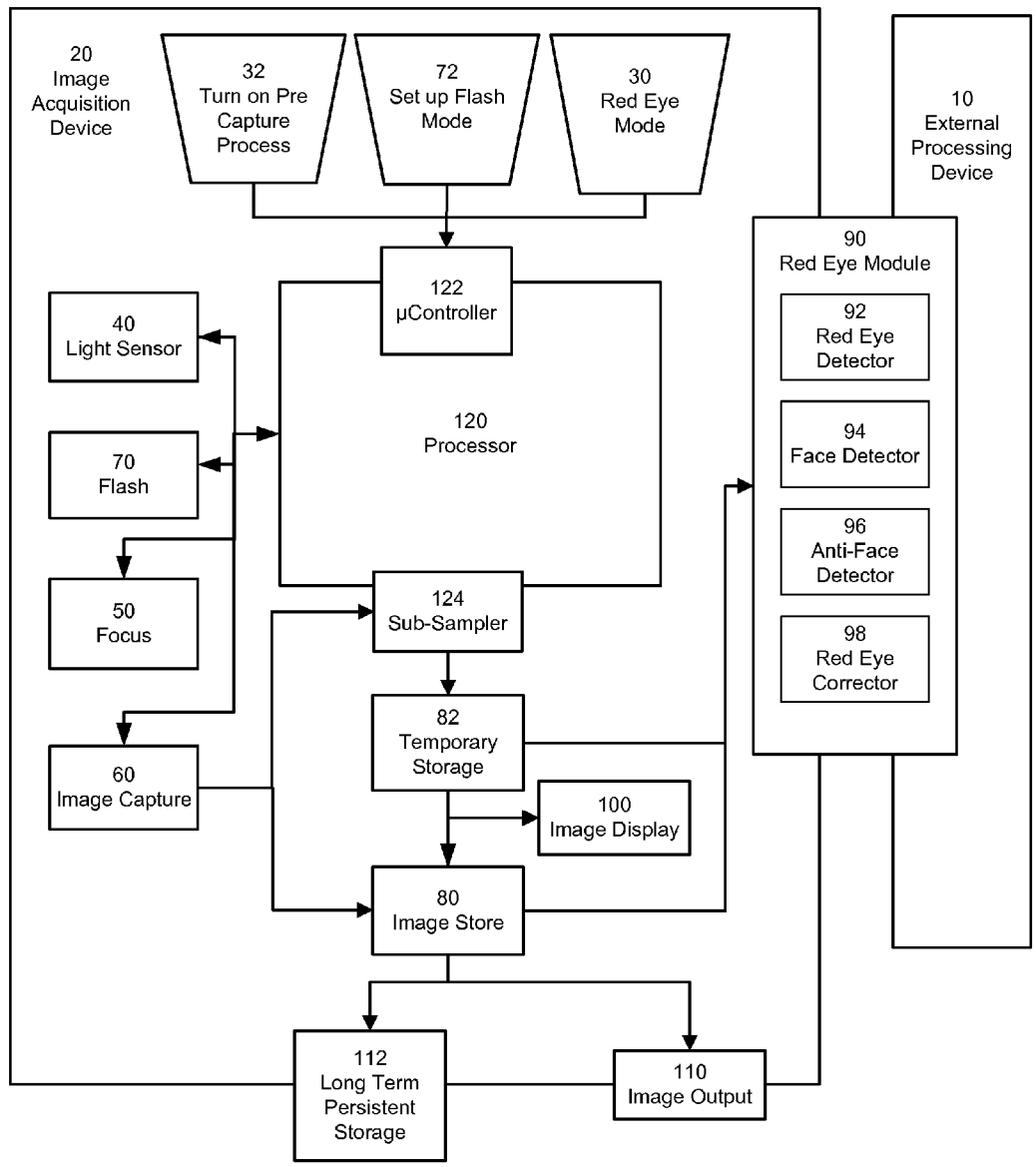
FIG. 1 illustrates a block diagram of an image acquisition device 20 operating in accordance with various alternative embodiments of the invention.

An image acquired with a flash may include red-eye defects. In general, these red-eye defects are detected by applying a conventional eye defect detector to the image. However images acquired with a high ISO rating, for example, greater than ISO 800, may include numerous small clusters of red-pixels indicative of noise and in such cases, the eye defect detector can identify the noise speckles as relatively small red eye defects.

Embodiments of the invention provide methods and apparatuses for detecting red eyes in high ISO flash images. For one embodiment of the invention, a digital image is acquired. One or more relatively large candidate red eye defect regions are detected in at least a portion of the image. Face detection is applied to at least a portion of the image to eliminate non-face regions and one or more relatively small candidate red eye defect regions are identified in at least a portion of the image not including the eliminated non-face regions.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable to wide range of systems in which image processing is effected. As noted above, an image acquired with a flash may include red-eye defects. In general, these red-eye defects are detected by applying a conventional eye defect detector to the image.

However images acquired with a high ISO rating, for example, greater than ISO 800, may include numerous small clusters of red-pixels indicative of noise and in such cases, the eye defect detector can identify the noise speckles as relatively small red eye defects.

In accordance with one embodiment of the invention, the effect of the noise speckles on the red eye defect detector can be mitigated by firstly applying anti-face detection to the image to eliminate regions of the image not comprising faces.

Face detection is well known in the art, for example as disclosed in US Patent Application No. 2002/0102024, hereinafter Viola-Jones. In Viola-Jones, a chain (cascade) typically comprising 32 classifiers based on rectangular (and increasingly refined) Haar features is used with an integral image, derived from an acquired image, by applying the classifiers to a sub-window within the integral image. For a complete analysis of an acquired image, this sub-window is shifted incrementally across the integral image until the entire image has been covered.

As the classifiers are increasingly more refined, the majority of non-face regions in an image are quickly eliminated after the first few classifiers in the cascade have been applied. Thus regions of an image that do not contain a face can be quickly and accurately determined. For example, in "Robust Real-Time Object Detection" Viola-Jones, Second International Workshop on Statistical and Computational Theories of Vision, Vancouver, July 2001, it is shown that it is possible to train a single two-feature classifier that will successfully detect 100% of faces with a 40% false positive rate. Thus, although 40% of the candidate face sub-windows it passes are not, in fact, face regions, practically 100% of the sub-windows it rejects are non-face regions.

In one embodiment of the invention, red eye detection of small red-eye defects is only applied to regions of an image not rejected by a relatively relaxed face detector, referred to herein as an anti-face detector. In this way, the computational efficiency and quality of the red-eye detection application can be improved.

FIG. 1 illustrates a block diagram of an image acquisition device 20 operating in accordance with various alternative embodiments of the invention. The digital acquisition device 20, which in the present embodiment is a portable digital camera, includes a processor 120. It can be appreciated that many of the processes implemented in the digital camera may be implemented in or controlled by software operating in a microprocessor, central processing unit, controller, digital signal processor and/or an application specific integrated circuit, collectively depicted as block 120 labelled "processor". Generically, all user interface and control of peripheral components such as buttons and display is controlled by a microcontroller 122. The processor 120, in response to a user input at 122, such as half pressing a shutter button (pre-capture mode 32), initiates and controls the digital photographic process.

Ambient light exposure is monitored using light sensor 40 in order to automatically determine if a flash is to be used. A distance to the subject is determined using a focus component 50, which also focuses the image on image capture component 60. If a flash is to be used, processor 120 causes the flash 70 to generate a photographic flash in substantial coincidence with the recording of the image by image capture component 60 upon full depression of the shutter button. The image capture component 60 digitally records the image in colour. The image capture component preferably includes a CCD (charge coupled device) or CMOS to facilitate digital recording. The flash may be selectively generated either in response to the light sensor 40 or a manual input 72 from the user of the camera. The high resolution image recorded by image capture component 60 is stored in an image store 80 which may comprise computer memory such a dynamic random access memory or a non-volatile memory. The camera is typically equipped with a display 100, such as an LCD, for preview and post-view of images.

In the case of preview images which are generated in the pre-capture mode 32 with the shutter button half-pressed, the display 100 can assist the user in composing the image, as well as being used to determine focusing and exposure. Temporary storage 82 is used to store one or more of the preview images and can be part of the image store 80 or a separate component.

For one embodiment, the camera 20 has a user-selectable red-eye mode 30 particularly for detecting and optionally correcting images, which have been acquired with a flash. A red eye module 90 analyzes and processes such images acquired from the image store 80 according to a workflow described below.

For one embodiment, the module 90 comprises a red-eye detector 92, a face detector 94, an anti-face detector 96 and a red-eye defect corrector 98, the operations of which will be described in more detail below. The module 90 can be integral to the camera 20, for one embodiment, module 90 could be the processor 120 with suitable programming—or part of an external processing device 10 such as a desktop computer.

Where the red eye module 90 is integral to the camera 20, the final processed image may be displayed on image display 100, saved on a persistent storage 112 which can be internal or a removable storage such as CF card, SD card or the like, or downloaded to another device, such as a personal computer, server or printer via image output means 110 which can be tethered or wireless. For various embodiments where the module 90 is implemented in an external device 10, such as a desktop computer, the final processed image may be returned to the camera 20 for storage and display as described above, or stored and displayed externally of the camera.

Figure 2:
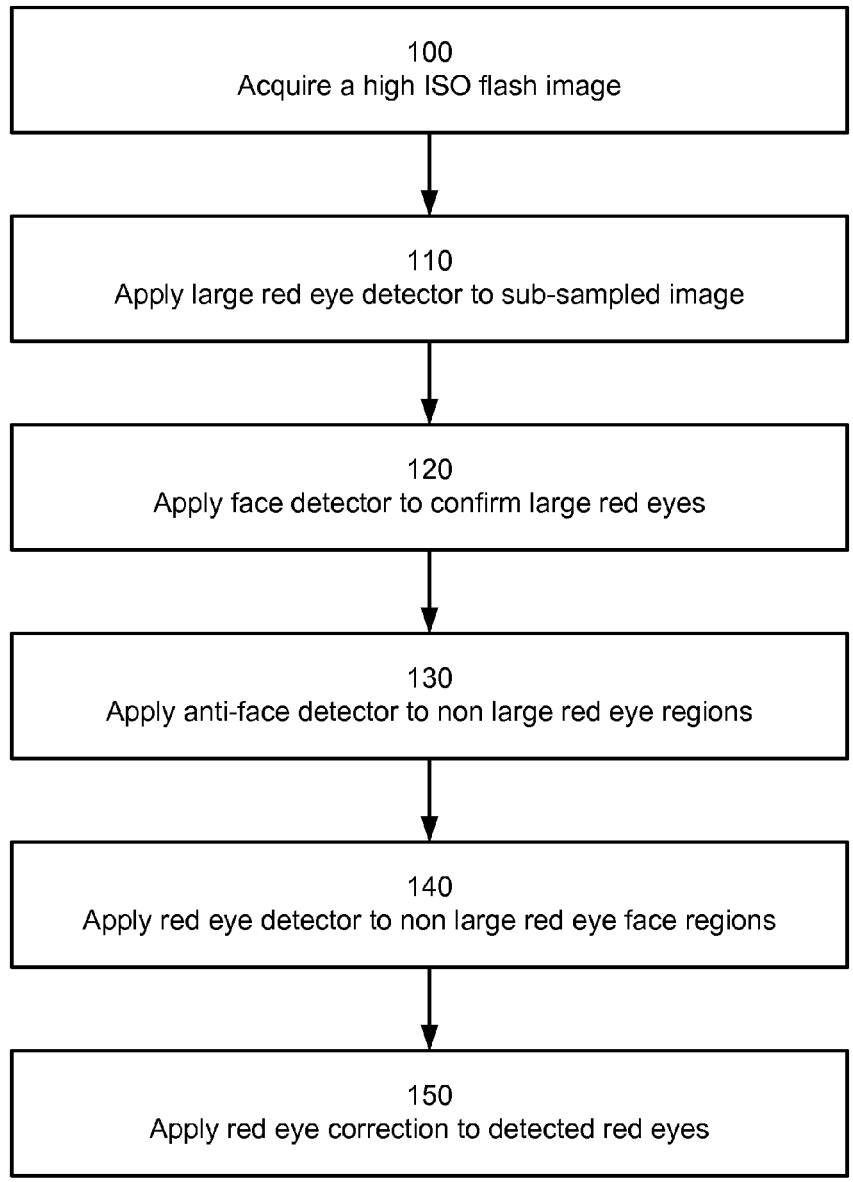
FIG. 2 illustrates a method for effecting red-eye detection in accordance with one embodiment of the invention.
Figure 3:
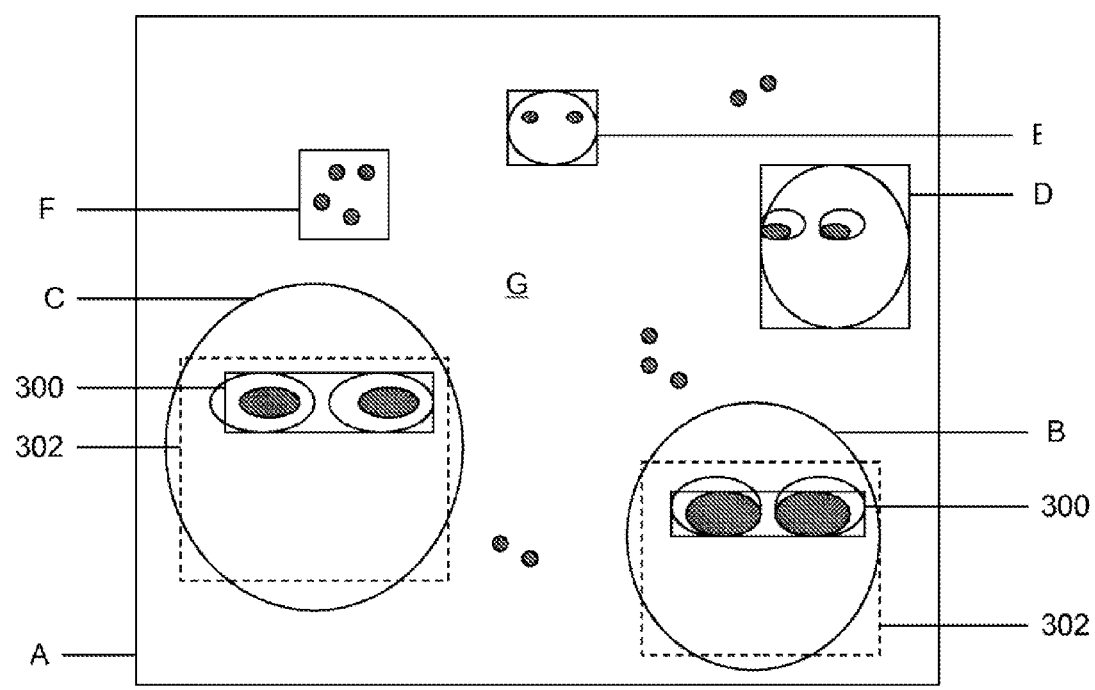
FIG. 3 illustrates a typical acquired image for which red-eye defect detection is effected in accordance with one embodiment of the invention.

FIG. 2 illustrates a method for effecting red-eye defect detection in accordance with one embodiment of the invention. At operation 100, a high ISO digital flash image is acquired in an otherwise conventional manner. A typical acquired image is described in FIG. 3. FIG. 3 illustrates a typical acquired image for which red-eye defect detection is effected in accordance with one embodiment of the invention. Image A, shown in FIG. 3, includes face regions, B and C, comprising relatively large red-eye defects, face regions, D and E, comprising relatively small red-eye defects, a face region F comprising a plurality of noise speckles F. The image A less the regions B-F comprises regions identifiably by a relaxed face detector as non-face regions, referred to herein as G.

For one embodiment of the invention, the image A is analyzed by the red-eye detector 92 to locate any relatively large red eye regions. Since the noise speckles appear in the image as relatively small red-pixel cluster artifacts, their presence does not largely affect the detection of large red eye defects. Thus, a standard red eye filter configured to locate relatively large red eye regions is applied to a sub-sampled version of the image, operation 110. Preferably the image is sub-sampled to 1024.times.768. However, it will be appreciated that the image may be sub-sampled to a greater degree, for example to 256.times.192.

As illustrated in FIG. 3, any candidate large red eye defect region 300 is bounded by a border (not necessarily rectangular), and for one embodiment, a boundary region 302 (not necessarily rectangular) is defined to include the border and a portion of the face surrounding the candidate region.

Referring again to FIG. 2, a conventional face detector 94 is preferably applied to a region including any detected boundary regions 302 in order to confirm the red eyes and identify surrounding face regions, operation 120.

The anti-face detector 96, which eliminates non-face regions of an image, is then applied to the full size image A.

For one embodiment, the anti-face detector 96 is applied to the full size image across a restricted range of scales. For example, the restricted range of scales may be based on anthropometric data and/or a size range of the noise speckles vis-a-vis the expected size of smaller red-eye defects, which might appear in an image. So for example, the smallest window size employed by the detector 96 could be determined by the smallest size face in an image for which there is a requirement to detect and correct red-eye defects, whereas the largest size window could be set as not exceeding the smallest sized face detected by the detector 94 in operation, 120.

More specifically, the smallest size of face is a function of the camera subsystem, the flash subsystem and the level of ambient lighting during image capture. Thus a camera with a stronger flash will generate red-eye effect in faces which are more distant from the camera and thus a smaller face size criteria should be used for such a camera. Similarly a higher level of ambient lighting will reduce the range at which red-eyes occur. Camera optics and sensor sensitivity will also determine the size threshold for the smallest face detector.

Typically no more than 4-5 sizes of face detector window would be employed (further granularity would reduce the speed of the detector) and typically decisions determined from the ambient lighting, lens configuration, exposure settings and flash strength would only affect the use of the 1-2 smallest size of face detector window.

As the combination of optics, sensor, lens and flash subsystems are quite unique to most models of digital camera an empirical calibration of this smallest size window threshold is typically required although it is possible to share calibration data between cameras with well-defined subsystem characteristics. Due to its non-linear nature this data is typically stored within the camera firmware as a set of look-up tables.

For one embodiment, the anti-face detector is an inverted face detector comprising a single two feature classifier with a 40% false positive rate as disclosed in the Viola-Jones paper referred to above.

An alternative method of face detection is described in US 2006/126,938, which discloses employing a measure of variance in an image sub-window to determine if the sub-window could possibly contain a face. If the variance of the sub-window lies below a particular threshold, a face cannot be detected, and the sub-window is rejected as not comprising a face.

As such, in an alternative implementation of the invention, a classifier based on variance of any sub-window within an image can be employed to quickly eliminate regions of an image not containing a face.

It will be appreciated that this variance based technique may be combined with the relatively relaxed Viola Jones face detector to improve the accuracy and/or speed of the anti-face detector.

For one embodiment, the anti-face detector 96 is applied to portions of the image A excluding large red eye face regions (B+C) confirmed by the face detector of operation 120, i.e. region (A−(B+C)), in order to eliminate non-face regions (A−(B+C+D+E+F)) of the image. However, it will also be appreciated that the anti-face detector 96 may be applied to the whole acquired image A.

Although almost 100% of the sub-windows passed by the anti-face detector are non-face regions, it is likely that some non-face regions F will not be eliminated by the anti-face detector 96.

For one embodiment, the red eye detector 92 is then applied to any regions of the image which were not eliminated by the anti-face detector of operation 130 as being non-face regions, and preferably excluding those regions confirmed as large red eye face regions in operation 120, for example, regions D+E+F in FIG. 3, in order to locate relatively small red eye defects, operation 140. It is understood that if no regions remain after the application of the anti-face detector 96, the red-eye defect detector 92 configured to detect relatively small red eye defects is not applied to the image.

In this way, any noise speckles in non-face regions eliminated by the anti-face detector 96, i.e. region (A−(B+C+D+E+F)), are not subjected to the red eye detection of operation 140, but face regions as well as non-face regions un-eliminated by the anti-face detector, i.e. region F, are subjected to the red eye detection of operation 140.

Thus, the regions of the image to which red eye detection is applied are significantly reduced, thereby increasing the computational efficiency of running the red eye detection application on a high ISO image. Furthermore, the probability of the red eye detector mistakenly identifying noise speckles as small red eye defects is reduced.

For one embodiment, the red eye defect corrector 98, such as that disclosed in U.S. patent application Ser. No. 11/282, 955 (FN128) is applied to those relatively large and relatively small red eye defect regions to correct the image, operation 150.

In an alternative embodiment of the invention, the operations of FIG. 1 are carried out only if the image was acquired with an ISO sensitivity of greater than or equal to 800.

General Matters

Embodiments of the invention include apparatuses and methods for effecting red-eye defect detection. Embodiments of the invention have been described above with various specific details. It will be appreciated that such details are examples and may be modified.

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

The invention claimed is:

1. A method for digital image red eye defect detection comprising:
    acquiring a digital image;
    identifying one or more relatively large candidate red eye defect regions in at least a portion of said digital image using a red eye detector configured to detect one or more relatively large candidate red eye defect regions;
    detecting one or more non-face regions within said digital image by applying anti-face detection to at least a certain portion of said digital image that does not include said one or more relatively large candidate red eye defect regions;
    within said digital image, identifying one or more candidate face regions;
    wherein each of the one or more candidate face regions is a portion of the digital image that
        (i) does not include any of said one or more non-face regions, and
        (ii) does not include any of said one or more relatively large candidate red eye defect regions; and
    identifying, within said one or more candidate face regions, one or more relatively small candidate red eye defect regions using the red eye detector configured to detect one or more relatively small candidate red eye defect regions;
    wherein the method is performed by one or more devices.

2. The method of claim 1 wherein the identifying one or more relatively large candidate red eye defect regions comprises identifying the one or more relatively large candidate red eye defect regions within a sub-sampled version of said digital image.

3. The method of claim 1 further comprising applying face detection to confirm said one or more relatively large candidate red-eye defect regions.

4. The method of claim 1 wherein said applying anti-face detection comprises applying relatively relaxed face detection to at least the certain portion of said digital image.

5. The method of claim 4 wherein said applying relatively relaxed face detection comprises applying a chain of two classifiers to at least the certain portion of said digital image.

6. The method of claim 4, wherein the applying relatively relaxed face detection comprises:
    measuring a variance value for at least the certain portion of the digital image;
    determining whether said variance value is less than a particular threshold; and
    in response to determining that said variance value is less than the particular threshold, detecting a particular non-face region of the one or more non-face regions in at least the certain portion of the digital image.

7. The method of claim 1 further comprising correcting said one or more relatively large candidate red eye defect regions and said one or more relatively small candidate red eye defect regions.

8. The method of claim 1 further comprising:
    determining whether said digital image has an ISO rating greater than 800; and
    in response to determining that said digital image has an ISO rating greater than 800, performing said method for digital image red eye defect detection.

9. One or more non-transitory processor readable media storing instructions which, when executed by one or more processors, cause performance of a method for digital image red eye defect detection comprising:
    identifying one or more relatively large candidate red eye defect regions in at least a portion of said digital image using a red eye detector configured to detect one or more relatively large candidate red eye defect regions;
    detecting one or more non-face regions within said digital image by applying anti-face detection to at least a certain portion of said digital image that does not include said one or more relatively large candidate red eye defect regions;
    within said digital image, identifying one or more candidate face regions;
    wherein each of the one or more candidate face regions is a portion of the digital image that
        (i) does not include any of said one or more non-face regions, and
        (ii) does not include any of said one or more relatively large candidate red eye defect regions; and
    identifying, within said one or more candidate face regions, one or more relatively small candidate red eye defect regions using the red eye detector configured to detect one or more relatively small candidate red eye defect regions.

10. The one or more non-transitory processor readable media of claim 9 wherein the identifying one or more relatively large candidate red eye defect regions comprises identifying the one or more relatively large candidate red eye defect regions within on a sub-sampled version of said digital image.

11. The one or more non-transitory processor readable media of claim 9, further comprising instructions for applying face detection to confirm said one or more relatively large candidate red-eye defect regions.

12. The one or more non-transitory processor readable media of claim 9 wherein said applying anti-face detection comprises applying relatively relaxed face detection to at least the certain portion of said digital image.

13. The one or more non-transitory processor readable media of claim 12 wherein said applying relatively relaxed face detection comprises applying a chain of two classifiers to at least the certain portion of said digital image.

14. The one or more non-transitory processor readable media of claim 12, wherein the applying relatively relaxed face detection comprises:
    measuring a variance value for at least the certain portion of the digital image;
    determining whether said variance value is less than a particular threshold; and
    in response to determining that said variance value is less than the particular threshold, detecting a particular non-face region of the one or more non-face regions in at least the certain portion of the digital image.

15. The one or more non-transitory processor readable media of claim 9 further comprising instructions for correcting said one or more relatively large candidate red eye defect regions and said one or more relatively small candidate red eye defect regions.

16. The one or more non-transitory processor readable media of claim 9, further comprising instructions for:
    determining whether said digital image has an ISO rating greater than 800; and in response to determining that said digital image has an ISO rating greater than 800, performing said method for digital image red eye defect detection.

17. A digital image acquisition device, comprising:
a lens and image sensor for acquiring digital images;
one or more processors;
a red eye detector configured to detect one or more relatively large candidate red eye defect regions that identifies one or more relatively large candidate red eye defect regions in at least a portion of said digital image;
an anti-face detector that detects one or more non-face regions within said digital image by applying anti-face detection to at least a certain portion of said digital image that does not include said one or more relatively large candidate red eye defect regions;
a candidate face detector that identifies, within said digital image, one or more candidate face regions; wherein each of the one or more candidate face regions is a portion of the digital image that
    (i) does not include any of said one or more non-face regions, and
    (ii) does not include any of said one or more relatively large candidate red eye defect regions; and
wherein the red eye detector:
    is configured to detect one or more relatively small candidate red eye defect regions, and
    identifies, within said one or more candidate face regions, one or more relatively small candidate red eye defect regions.

18. The device of claim 17, wherein the red eye detector identifying one or more relatively large candidate red eye defect regions comprises identifying the one or more relatively large candidate red eye defect regions within a sub-sampled version of said digital image.

19. The device of claim 17, further comprising a face detector that applies face detection to confirm said one or more relatively large candidate red-eye defect regions.

20. The device of claim 17, wherein said anti-face detector applying anti-face detection comprises applying relatively relaxed face detection to at least the certain portion of said digital image.

21. The device of claim 20, wherein said anti-face detector applying relatively relaxed face detection comprises applying a chain of two classifiers to at least the certain portion of said digital image.

22. The device of claim 20, wherein the anti-face detector applying relatively relaxed face detection comprises:
    measuring a variance value for at least the certain portion of the digital image;
    determining whether said variance value is less than a particular threshold; and
    in response to determining that said variance value is less than the particular threshold, detecting a particular non-face region of the one or more non-face regions in at least the certain portion of the digital image.

23. The device of claim 17, further comprising a defect corrector that corrects the one or more relatively large candidate red eye defect regions and the one or more relatively small candidate red eye defect regions.

24. The device of claim 17, further comprising:
an ISO rating detector that determines whether said digital image has an ISO rating greater than 800;
wherein the red eye detector, the anti-face detector, and the candidate face detector are configured to activate in response to the ISO rating detector determining that said digital image has an ISO rating greater than 800.

25. A computer-executed method comprising:
identifying, in at least part of a digital image, one or more non-face regions of the digital imam,
identifying one or more potential face regions of the digital image that are not within portions of the digital image that correspond to the one or more non-face regions of the digital image; and
identifying one or more red eye regions within the digital image by applying red-eye detection to the one or more potential face regions of the digital image and not to the one or more non-face regions of the digital image; and
prior to identifying the one or more non-face regions of the digital image:
    applying red-eye detection to the digital image to identify one or more relatively large red eye regions within the digital image; and
wherein the step of identifying one or more non-face regions is performed by identifying non-face regions only in portions of the image that do not include the one or more relatively large red eye regions;
wherein the method is performed by one or more devices.

26. The computer-executed method of claim 25, further comprising:
applying face detection to at least a portion of the digital image that includes the one or more relatively large red eye regions within the digital image;
confirming that the one or more relatively large red eye regions are surrounded by face regions;
in response to confirming that the one or more relatively large red eye regions are surrounded by face regions, removing the one or more relatively large red eye regions from the at least part of the digital image.

27. A digital image acquisition device, comprising:
a lens and image sensor for acquiring digital images;
one or more processors;
a non-face region detector identifying, in at least part of a digital image, one or more non-face regions of the digital image;
wherein identifying the one or more non-face regions is performed by identifying non-face regions only in portions of the image that do not include one or more relatively large red eye regions;
a potential face region detector identifying one or more potential face regions of the digital image that are not within portions of the digital image that correspond to the one or more non-face regions of the digital image;
a red eye region detector identifying one or more red eye regions within the digital image by applying red-eye detection to the one or more potential face regions of the digital image and not to the one or more non-face regions of the digital image; and
a large red eye region detector applying red-eye detection to the digital image to identify the one or more relatively large red eye regions within the digital image prior to the non-face region detector identifying the one or more non-face regions of the digital image.

28. One or more non-transitory processor readable media storing instructions which, when executed by one or more processors, cause performance of:
identifying, in at least part of a digital image, one or more non-face regions of the digital image;
identifying one or more potential face regions of the digital image that are not within portions of the digital image that correspond to the one or more non-face regions of the digital image; and
identifying one or more red eye regions within the digital image by applying red-eye detection to the one or more potential face regions of the digital image and not to the one or more non-face regions of the digital image; and prior to identifying the one or more non-face regions of the digital image:
applying red-eye detection to the digital image to identify one or more relatively large red eye regions within the digital image; and wherein the step of identifying one or more non-face regions is performed by identifying non-face regions only in portions of the image that do not include the one or more relatively large red eye regions.

* * * * *